(12) United States Patent
Winterton

(10) Patent No.: US 11,057,819 B2
(45) Date of Patent: Jul. 6, 2021

(54) PHYSICAL WEB BEACON, CLIENT AND PROXY

(71) Applicant: Intel Corporation, Santa Clara, CA (US)

(72) Inventor: Richard R. Winterton, Provo, UT (US)

(73) Assignee: Intel Corporation, Santa Clara, CA (US)

( * ) Notice: Subject to any disclaimer, the term of this patent is extended or adjusted under 35 U.S.C. 154(b) by 138 days.

(21) Appl. No.: 15/712,871

(22) Filed: Sep. 22, 2017

(65) Prior Publication Data

US 2019/0098555 A1 Mar. 28, 2019

(51) Int. Cl.
| | |
|---|---|
| *H04W 40/24* | (2009.01) |
| *G06F 21/44* | (2013.01) |
| *G06F 21/60* | (2013.01) |
| *H04L 29/08* | (2006.01) |
| *H04W 12/08* | (2021.01) |
| *H04L 29/06* | (2006.01) |

(Continued)

(52) U.S. Cl.
CPC .......... *H04W 40/244* (2013.01); *G06F 21/44* (2013.01); *G06F 21/602* (2013.01); *G06F 21/606* (2013.01); *H04L 63/0281* (2013.01); *H04L 67/18* (2013.01); *H04W 12/08* (2013.01); *H04W 12/108* (2021.01); *H04W 12/122* (2021.01); *H04W 12/60* (2021.01); *H04W 12/77* (2021.01); *H04W 48/12* (2013.01); *H04W 48/16* (2013.01)

(58) Field of Classification Search
CPC ......... H04L 67/02; H04L 51/18; H04L 67/20; G06F 16/95; G06F 16/00; G06F 16/44; H04N 1/00161; H04W 40/244; H04W 12/06

USPC ......................................................... 709/217
See application file for complete search history.

(56) References Cited

U.S. PATENT DOCUMENTS

| | | | |
|---|---|---|---|
| 2003/0217267 A1* | 11/2003 | Kindberg .............. | H04W 12/06 713/168 |
| 2006/0184998 A1* | 8/2006 | Smith ................. | H04L 12/4679 726/3 |

(Continued)

OTHER PUBLICATIONS

Antonio Solano et al., "One-Time URL: A Proximity Security Mechanism between Internet of Things and Mobile Devices," Oct. 13, 2016, 17 pages, www.mdpi.com/journal/sensors.

(Continued)

*Primary Examiner* — Mahran Y Abu Roumi
(74) *Attorney, Agent, or Firm* — Schwabe, Williamson & Wyatt, P.C.

(57) ABSTRACT

The physical web is an interesting development in networking technology. A beacon may broadcast beacon data and, if desired, a data payload. In various embodiments, a proxy may receive contact from a mobile machine that came into contact with a beacon and received data bringing the mobile machine to the proxy. The proxy may dynamically select a redirection for the mobile machine based on a variety of considerations discussed herein. The proxy may also employ cryptographic and context analysis to the contact from the mobile device to determine if the redirection should happen. And the proxy may review contacts originating from various beacons to determine whether the contacts, or lack thereof, from a beacon suggests the beacon needs to be investigated for failure, error, or tampering with it or its environment.

23 Claims, 9 Drawing Sheets

(51) Int. Cl.
*H04W 12/60* (2021.01)
*H04W 12/77* (2021.01)
*H04W 12/108* (2021.01)
*H04W 12/122* (2021.01)
*H04W 48/16* (2009.01)
*H04W 48/12* (2009.01)

(56) References Cited

U.S. PATENT DOCUMENTS

| | | |
|---|---|---|
| 2012/0246247 A1 | 9/2012 | Lim et al. |
| 2015/0081382 A1* | 3/2015 | L'Heureux ......... G06Q 30/0281 |
| | | 705/7.29 |
| 2016/0277999 A1* | 9/2016 | Graves ................ H04W 40/244 |
| 2017/0111763 A1* | 4/2017 | Morgan ............... H04B 7/0617 |
| 2017/0243273 A1* | 8/2017 | Ward, Jr. ........... G06Q 30/0623 |
| 2017/0273008 A1* | 9/2017 | Friday .................. H04W 16/28 |

OTHER PUBLICATIONS

Jae-Hwan Jin et al., "B2Card: A Business Card Android Application Utilizing BLE Beacon Technology," 2015, pp. 85-88, Advanced Science and Technology Letters, vol. 117 (Mobile and Wireless 2015).

* cited by examiner

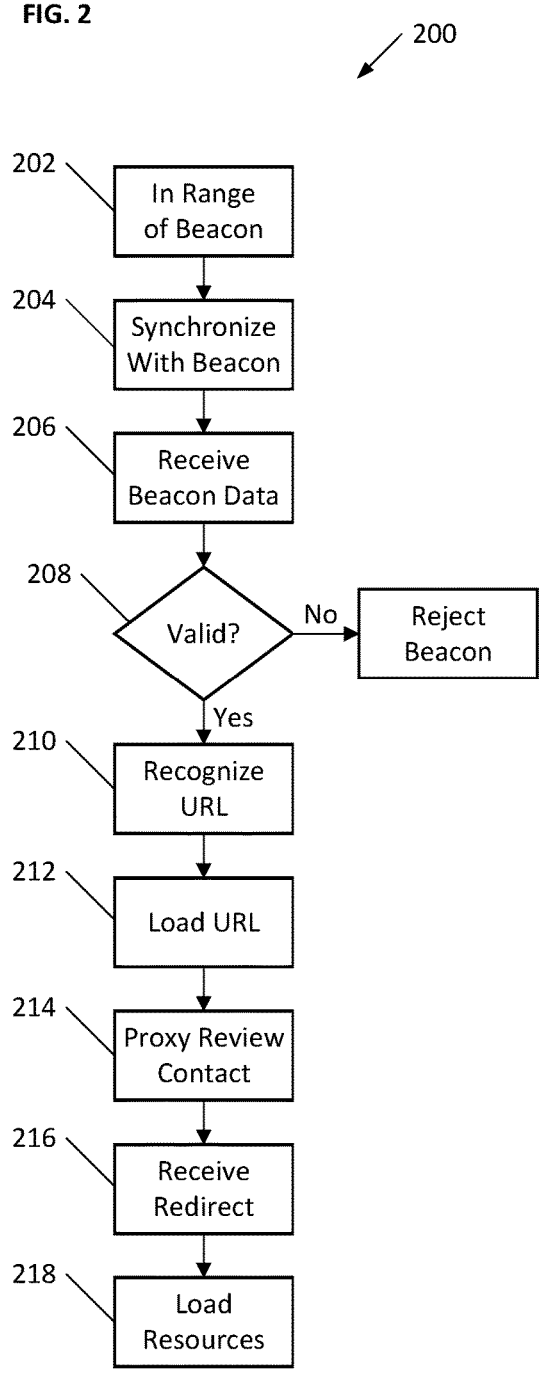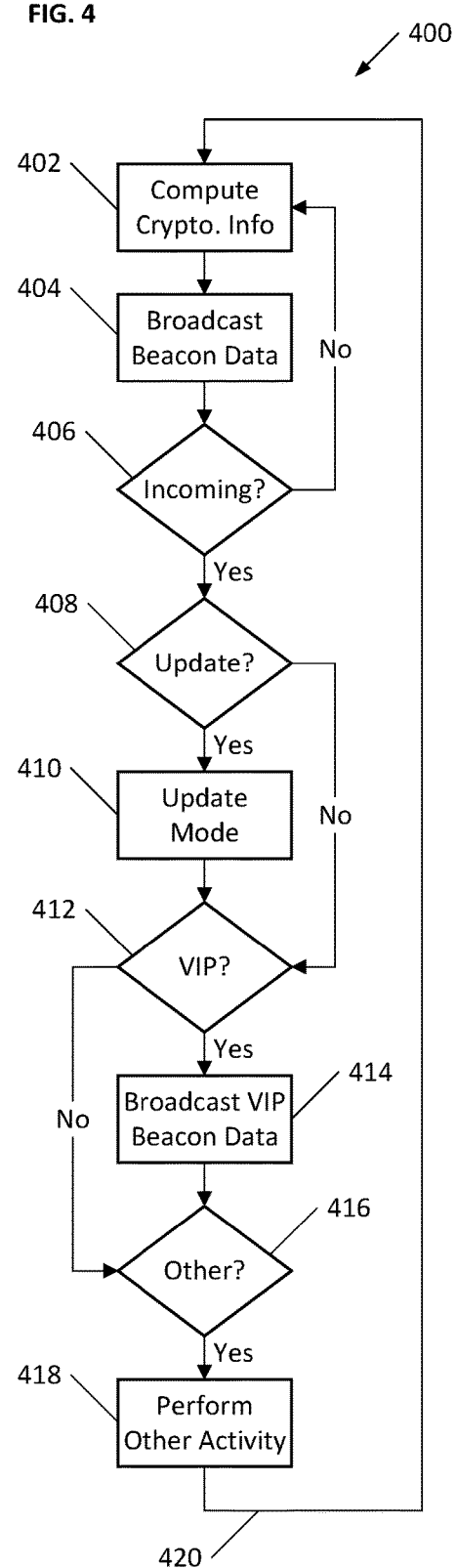

PHYSICAL WEB BEACON, CLIENT AND PROXY

TECHNICAL FIELD

The present disclosure relates to the physical web, and more particularly, to managing physical web beacons and providing a dynamic proxy for resolving and optionally authenticating beacon data.

BACKGROUND AND DESCRIPTION OF RELATED ART

The proliferation of Internet enabled devices, the Internet of Things (IoT) and and other technologies has enabled interactive communication between known and sometimes unknown devices. The interactions may allow for a variety of transactions, such as purchase of goods, receipt of information, or other communicative event over a possibly temporary communication path formed between two devices. A relatively recent concept is that of the physical web. This concept ties together mobile machines, such as cell phones, tablets and other portable electronics to IoT environments, hardware beacons, or interoperate in other networking situations.

See for example a discussion of the physical web at Uniform Resource Locator (URL) Google.github.io/physical-web, which notes at the time of filing this application the "Physical Web enables you to see a list of URLs being broadcast by objects in the environment around you. Any object can be embedded with a Bluetooth Low Energy (BLE) beacon, which is a low powered, battery efficient device that broadcasts content over bluetooth. Beacons that support the Eddystone" (see, e.g., Internet URL github.com/google/eddystone) "protocol specification can broadcast URLs. Services on your device . . . can scan for and display these URLs after passing them through a proxy." URLs may not only indicate an Internet location to which a mobile machine could be directed, but it may also include identification of the machine, e.g., a URL may be formatted with embedded variables such as an id: "exampleserver.com/?id=12345".

With the likely to be billions of IoT and physical web devices expected to be out in the world, device management becomes an issue. In addition, because the Eddystone protocol provides a short (e.g., 17) bytes for the URL packet, intelligent URL handling and smart proxy processing will become increasingly important as the physical web becomes more prevalent.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 2 illustrates an exemplary environment 200.
FIG. 4 illustrates an exemplary environment 400.

DETAILED DESCRIPTION

Figure 1:
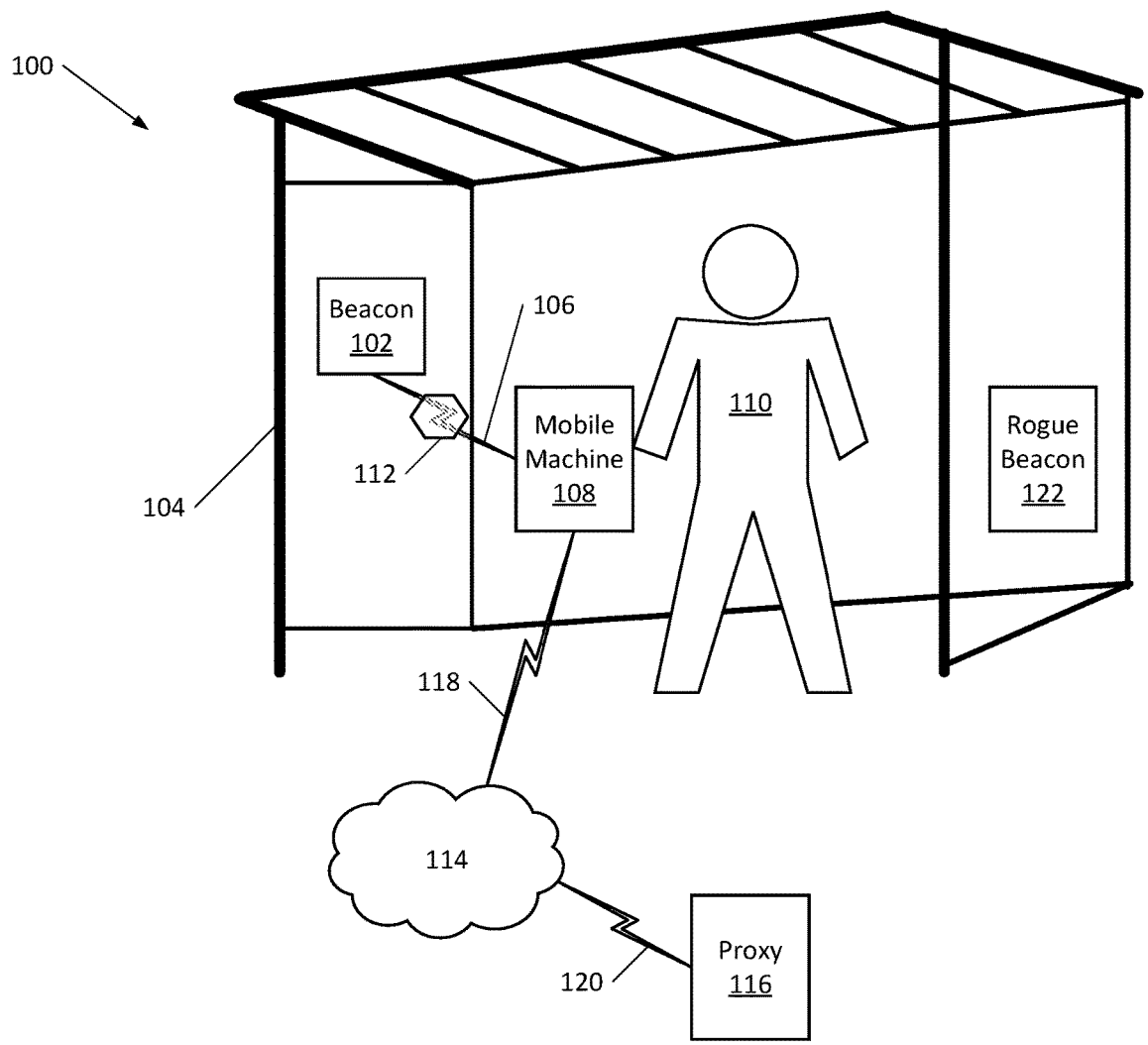
FIG. 1 illustrates an exemplary environment 100.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations do not have to be performed in the order of presentation. Operations described may be performed in a different order than the described embodiment. Various additional operations may be performed and/or described operations may be omitted in additional embodiments. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are considered synonymous.

As used herein, the term "circuitry" or "circuit" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, processor, microprocessor, programmable gate array (PGA), field programmable gate array (FPGA), digital signal processor (DSP) and/or other suitable components that provide the described functionality. Note while this disclosure may refer to a processor in the singular, this is for expository convenience only, and one skilled in the art will appreciate multiple processors, processors with multiple cores, virtual processors, etc., may be employed to perform the disclosed embodiments.

As noted above, technology such as the Physical Web is a relatively new and developing technology that may be supported by mobile machines such as cellphones, tablets, computers, Internet of Things (IoT) devices, or any mobile machine or device that may be physically moving, including those moving as being part of a transportation device.

FIG. 1 illustrates an exemplary environment 100 in which shown are a beacon 102 attached to a structure 104, which for exemplary purposes is a shelter such as that may be used for obtaining transportation, e.g., a bus stop, taxi stand, private carriage service, ticketing area for an event, ticketing area for transportation, etc. The beacon, as noted above broadcasts a signal 106 that may be in accord with any communication protocol. If for expository convenience we assume the beacon is a Physical Web beacon, then the beacon may be broadcasting in accord with the Eddystone signaling technique. It will be appreciated that Eddystone is presented as one communication example but other communication technologies or network discovery techniques may be applied to interconnect different devices, such as multicast Domain Name System (mDNS) (see, e.g., Internet Engineering Task Force (IETF) Request For Comments (RFC) 6762), Universal Plug and Play (uPnP) over WiFi™. A broadcasted signal may be picked up by a mobile machine 108 that is proximate to the structure, such as by a mobile telephone or other smart device, tablet, phablet, computer, notebook, IoT device, etc. It will be appreciated although the mobile machine is illustrated as carried by a person 110, it is not necessary for a person to be present and instead the mobile machine may be part of another machine that comes into proximity of the beacon. For example the mobile device may be part of a transportation device such as a bus, train, taxi, private carriage, etc., that comes into range of the beacon transmission.

In the illustrated embodiment, the broadcast 106 contains beacon data 112, which is simply data that is broadcasted by the beacon, or in some circumstances (not illustrated), otherwise associated with the beacon. By broadcasting with a low-power technology such as lower power Bluetooth (BLE) it is possible to both minimize power requirements of a beacon if the beacon is battery powered, as well as to assist with ensuring a recipient mobile machine 108 (or machines) are proximate to the beacon. Proximity becomes more important when, for example, the information provided by or associated with the beacon is relevant to that beacon's specific location. If the beacon is associated with bus stops, it is helpful to ensure that bus ticket pricing information associated with a beacon broadcast is constrained to devices near that bus stop. In some embodiments, the beacon data contains a shortened Uniform Resource Locator (URL) to direct the mobile machine to a specific location on a network 114, such as a proxy server 116 that is configured to interact further with the mobile machine. A shortened URL service may be used that provides a unique URL for a beacon to allow, simply based on URL access, to track accesses to a particular beacon (1:1 correspondence between beacon and URL) or set of beacons sharing a URL (many-to-one correspondence). Even if every beacon is assigned a unique URL to broadcast, the proxy 116 may classify or otherwise group beacons and redirect mobile machines to a same or similar resource on the network. There may be a 1:1 relationship between URLs and beacons, or groupings of beacons may be associated with a particular URL. In one embodiment the server can dynamically disable (e.g., not redirect) a particular URL, such as if a temporary beacon is no longer needed, or in high-traffic environments, the proxy may distribute a heavily loaded device to different servers to allow load-balancing network resources.

In some embodiments, broadcasted beacon data is automatically received 206. For example, in one embodiment, a Notifications feature that is currently supported by a variety of browsers and platforms such as Google Chrome™, Android Platform™, Safari® and iOS are currently supporting Notifications. In a bus stop example, when a person wants to catch a bus, and gets to the stop, their mobile machine would automatically receive the beacon data, e.g., in one embodiment an Eddystone type of beacon placed at the bus stop. When their mobile machine is in range of the beacon, they may receive a notification that may direct the user of the mobile machine to a short branded URL location. This URL in turn may resolve to a server that tracks the location of the bus, the time the bus should arrive at the specific bust stop, and allow the user to purchase a ride. This may occur all without a user ever having to look up a URL, install an application, or even identify themselves or their location on a website.

It will be appreciated that the mobile machine may establish a communication path 118 with the proxy 116 to the network 114 by any communication technology, such as over a cellular data network, Wi-Fi™ (a standard by the Wi-Fi Alliance for networking based on the Institute of Electrical and Electronics Engineers (IEEE) 802.11 standards, or other short-range or long-rage radio (or even wired) communication technology including those discussed further below with respect to FIG. 6. The mobile machine may use the shortened URL received in the proxy data, or it may use a different URL corresponding to the beacon data's shortened URL but that may have been altered by the mobile machine.

It will be further appreciated communication between a beacon 102 and a mobile machine 108 may be bi-directional, so that the beacon may trigger a communication session by broadcasting the beacon data 112 and the mobile device may then respond to it and perhaps elicit customized data from the beacon. This could be used, for example, to provide a general URL in the broadcast to which the mobile machine may identify itself as a VIP device and thus the beacon may then provide a VIP broadcast for that mobile machine. However, this may raise security concerns (as well as cost by making the beacons more complex) as it would be possible for beacons to start tracking the movement of the mobile machine. Since some protocols require the beacon to broadcast its data using HTTPS (a secure hypertext transport protocol (HTTP)), such as the Google Chrome physical web support and Android Nearby Notifications, a the beacon may be configured with an antenna or other communication option. The mobile machine may then establish a connection (possibly anonymous) back to the beacon with a "VIP" HTTPS certificate which indicates to the beacon to provide VIP beacon data. Alternatively, presuming the beacon is configured to be broadcast only, VIP recognition may instead be determined and handled by the Proxy 116.

Note that there is the risk of a rogue beacon 122 being illicitly inserted into an environment, such as the structure 104. Such a device may intermittently steal connections from a mobile machine 108 entering the area, thus providing the rogue an opportunity to perform illicit operations, e.g., inject viruses into the mobile machine, engage the machine to obtain financial information, etc. It will be appreciated the rogue could perform an illicit act and then attempt to redirect the mobile machine to the proxy 116 as if nothing untoward had occurred. As will be discussed below with respect to FIG. 2 various options are available for minimizing such a threat.

FIG. 2 illustrates an exemplary environment 200 illustrating a mobile machine engaging with a beacon. In this embodiment, as discussed above a mobile machine comes 202 into range of a beacon broadcasting its beacon data. As noted above, there may be a risk of a rogue beacon illicitly inserted into an environment. In an effort to prevent this, it will be appreciated the beacon data may incorporate security provisions such as a rotating token, e.g., a rolling code generated by the Google Authenticator and similar technologies, or some or all of beacon data broadcast by the beacon may be encrypted.

In one embodiment, a mobile device may need to synchronize 204 with the beacon to enable authenticating the beacon. This may be unnecessary if the mobile machine has already loaded an app or gone to a webpage that facilitates getting security credentials. If credentials are needed, this may be accomplished in a variety of ways including the mobile machine scanning a barcode, Quick Response (QR) code, or other marking on the beacon to direct the mobile machine to the credentials. Or, the beacon (or system of beacons such as by a transit authority) may be looked up in a known or trusted registry to help establish synchronization. Or, a web page (which may be identified on the beacon) may be accessed to assist with synchronization, including downloading security software, security certificates, tokens, profiles, or the like. After synchronizing with the beacon, if it was needed, a mobile device may then receive 206 the beacon data broadcast by the beacon.

In one embodiment the beacon may incorporate identifying characteristics of the contacting mobile machine in the beacon data, such as storing the network interface (NIC) machine access control (MAC) ID, which while not unique, it may be considered operationally unique within the short timespan in which beacon-related communication occurs. The identifying characteristic may be encoded, hashed, or otherwise cryptographically secured to minimize ability alter the information. By embedding this information, additional security may be realized since if a rogue device attempts to sit in-between the beacon and the proxy, the proxy will be able to determine a connecting mobile machine does not have the same operationally unique identifying characteristics that was recorded by the beacon.

It will be understood a beacon might not employ security measures, but assuming synchronizing 204, a following operation is to validate 208 the received beacon data. If a token-based approach is implemented, the mobile machine may validate by checking what the expected rotating token should be and confirm this token is present in the beacon data. It will be appreciated the use of the token is one form of a cryptographic technique that may be used to secure communication, but others may be used, such as a public key infrastructure (PKI) environment where a private key known to the beacon is used to encrypt and/or encode some or all of the beacon data being broadcast. The mobile machine may acquire a public key for the beacon, such as by way of a known key server. In some environments, such as within a large private structure, such as a large warehouse or large store, in a shipping center/"mall", in a city transportation system, etc., the environment may provide a key for all of its beacons by way of a known private key server or by way of a public key server. For example in the city example, a commuter's mobile machine may obtain a key to authenticate the beacon in advance, or the mobile machine may acquire the key when it comes into contact with the beacon such as by scanning a code on the beacon as discussed above for synchronizing 204.

The mobile device may receive 206 the beacon data, and assuming use of some cryptographic verification technique, e.g., rolling token, PKI, or other validation technique, the mobile machine may validate 208 the received beacon data. In one embodiment, instead of an authenticator type of token, instead a sequence number is associated with a URL or data payload (e.g., Eddystone and similar technologies provide for a small data payload along with the URL). Since the proxy or proxies (there may be multiple servers to handle beacon-initiated contacts may track contact, seeing an incorrect/invalid sequence of numbers may trigger and error/need to investigate to see if a beacon is malfunctioning or compromised. In another embodiment, rolling clock windows (time) values are associated with a URL or data payload. In one embodiment, the clock value may be hashed in accord with a cryptosystem to verify them, and once received the clock values may be used to identify communication delay, which may in turn help identify interference with beacon operation.

In one embodiment, for simplicity, the beacon data caters to a single action, e.g., the mobile device is consuming a piece of content to perform an action, which facilitates both a simple beacon design, and facilitates a broadcast only arrangement. It will be appreciated the data being broadcast may be arbitrary. In the illustrated embodiment the beacon data includes a URL. It will be appreciated the beacon may only be transmitting a URL, or it may be broadcasting data including a URL. After receiving 206 the beacon data the mobile machine may then recognize 210 the URL within the beacon data. In one embodiment, instead of simply using an existing shortened URL creation scheme, instead illustrated embodiments provide for dynamic URL destinations which typical short URLs do not provide.

In one embodiment, there may also be an expected duration of communication associated with a URL, where if the duration is not correct then an error alert may be generated. For example if a beacon is used by a public transportation system, a request to the URL would be expected at least once during the duration between one stop and the next stop. If the proxy server does not receive a request with the designated beacon data that identifies the specific beacon of interest during that duration, it may mean there is a problem and in response a duration alert may be issued. In some embodiments, beacons are given easily recognizable branded shortened URLs that may assist with security. A user of the mobile machine may be able to see the URL and, if directed to an incorrect location, may realize that the beacon and/or the proxy may be compromised. can also provide for branded short URL which is important for security. It would also provide for the capability to selectively disable specific branded URL for security reasons. It will be appreciated the URL may be arbitrarily formatted. In some embodiments, the protocol used by the beacon may limit the size of the URL (see, e.g., Eddystone limitations discussed above in paragraph 4 and/or any payload that may be associated with it. Thus is some embodiments, a shortened URL may be used to minimize transmission requirements, as well as to either provide for obfuscating the target of the broadcasted URL, if target-privacy is desired, or to simplify a user recognition that the URL is authentic.

Figure 3:
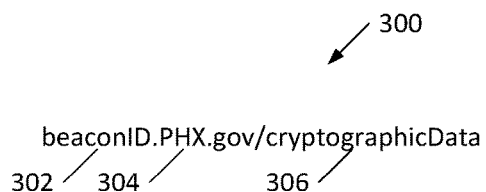
FIG. 3 illustrates an exemplary Uniform Resource Locator (URL) 300.

For example, FIG. 3 illustrates an exemplary Uniform Resource Locator (URL) 300 that may be broadcasted. In this example, assume the city of Phoenix Arizona uses shortened URLs for its beacons. As illustrated, the format of the URL could be a combination of a beaconID 302, with a city domain name PHX.gov 304. While seeing PHX.gov would assist a user in knowing the beacon is a valid city beacon since PHX.gov is presumably only accessible to an authorized city resource, it is not guaranteed that the user can see it, e.g., the mobile machine interface might not present, or may not be able to present (e.g., some IoT devices may have limited or simply lack a display), the broadcasted URL to the user. One way to assist with validating the beacon, as discussed above, the URL may include a cryptographic component 306 for validating beacon data. Please note that for presentation convenience, the illustrated URL may contain more characters than may be supported by a given beacon broadcast protocol. In an implementation of the URL, the "beaconID" 302 may be replaced with a shorter ID number. Similarly, the cryptographicData 306 component may be replaced with a shorter token value, hash value, or as noted above the entire URL 300 may be encoded with a PKI and hence unreadable without use of a corresponding public key associated with the broadcasting beacon.

Continuing again with FIG. 2, after recognizing 210 the URL, the mobile machine loads 212 the URL. In the illustrated embodiments, loading the URL directs the mobile machine to a proxy, see, e.g., FIG. 1 item 116. Although this figure is directed primarily to operations from the perspective of a mobile machine, it will be appreciated on contacting the proxy, the proxy may review 214 the contact from the mobile machine, perform data tracking, check for security issues, and the like. The mobile device may receive 216 a redirection from the proxy that may be based on a variety of factors. That is, rather than a beacon sending the mobile machine to a specific network location, such as an Internet web address, instead the mobile machine is directed to the proxy which can, depending on various considerations, redirect the mobile machine to a dynamically generated destination. When this dynamic redirection is received 216, the mobile machine may load 218 the identified resource accordingly.

The ability to change dynamically where a beacon URL directs a mobile machine provides for opportunities to provide dynamic services responsive to the location of the beacon. For example, if the beacon has a custom shortened URL identifying that beacon, and the beacon is a mobile beacon, e.g., it is relocated periodically, or perhaps installed in a moving vehicle/transportation device, then based on some criteria such as its current location, time of day, congestion, crowd demographics, event schedules, multi-user/multi-player groups proximate to the beacon, etc. the proxy may dynamically change the destination for the URL to be relevant to a current location. Unlike conventional dynamic URL redirection schemes and services, in the illustrated embodiment, the contact review 214 and proxy analysis allows not only conventional tracking of how many times a particular URL is accessed (such as to gauge popularity of a beacon), but also to track where the mobile machine was directed from. This can be determined in a variety of ways, including based on the URL used to access the proxy, data embedded within the URL or as a variable in the URL, or in a beacon payload (if any).

In the review 214 the proxy may also apply heuristics to help determine if a particular beacon is operating correctly. For example, use profiles can be built that can allow a proxy to predict use patterns for a beacon and if there is a significant change in expected contacts arising out of using that beacon, it may mean a beacon has broken and need replaced. A proxy may know the location and origin of a URL (e.g., when the shortened URL has a 1:1 mapping to the beacon, has an embedded ID, or other identifying characteristic in the beacon data), and therefore it may provide custom alerts to a repair team when a particular URL is not being accessed. For example, if no accesses are being generated by a beacon at a movie theater, or there is an unexpected drop in accesses, then the beacon may be failing or have failed. Alternatively, as discussed above, a rogue beacon may have been illicitly employed, and assuming the rogue can mimic a beacon and trick a mobile device into using it, this may cause a drop in contact from the legitimate beacon. In this scenario, loss of legitimate contact can be recognized and trigger a repair and/or investigation that will reveal a rogue influence.

It will be appreciated that the received 216 redirection may be dynamically generated based on any criteria of interest. For example, if the beacon is associated with a sporting arena, the proxy may be configured to understand that the arena beacon is presenting a show today from Organization A (e.g., a soccer match), and tomorrow from Organization B (a rugby game), and if a mobile machine comes into contact with the beacon today, the proxy redirects the mobile machine to information, or ticketing options, or the like for Organization A. But were the mobile machine to come into contact with the beacon tomorrow, it would instead be redirected to material for Organization B. Similarly, for a bus station, the proxy may redirect based on the time of day, e.g., peak hours cost more, off-peak less. Or, there could be a fare sale, or holiday season for which rates are reduced. Rates might be eliminated, for example, on a holiday (or day after) a holiday associated with drinking. Certain days of the week might be deemed free, or a flat rate used for a day when an all-day event is occurring nearby.

Health, environment or safety concerns can also be automatically handled by the proxy. For example, the proxy may receive information from other sources that air quality is poor and this may result in a dynamic change to where a mobile device is redirected. Instead of getting a fare instead a warning may be presented with then the option to purchase a ticket, or simply be informed the fare is temporarily free to encourage people to avoid travel outdoors. It will be appreciated the criteria is endless and needs to only be set in the proxy as that proxy can identify the origin beacon and redirect a mobile machine accordingly. Safety may also be a concern, and in the event of an emergency, a proxy may direct people to resources to assist with the emergency based on the location from which the mobile machine is making contact. As with other examples discussed herein, pricing may be adjusted to accommodate circumstances.

As will be understood by one skilled in the art, private beacons may be employed. For example, large retail chains may purchase proxy servers, and configure them to respond to beacons within their stores. This allows any desired incentive within the store based on any criteria desired, such as time in store, movement pattern within the store, cascading offers to entice paired product purchases, or the like. For example, a store could start a sale and then start redirecting mobile machines to a page that says buy Product A at one price and get Product B at a discount or perhaps free. Prices in the store could also change over time, be based on position in the store (e.g., to attract attention to unpopular sections), be based on past purchase and/or activity history (assuming the mobile machine has established a known identity with the store), incorporate any combination of these, or other rationale.

FIG. 4 illustrates an exemplary environment 400 from the perspective of the beacon. While most activity occurs with the proxy and mobile device, there are embodiments that may focus on the beacon. In the illustrated embodiment it is assumed the beacon is computing 402 its cryptographic info, such as a rolling token, or other encoding as needed for broadcasting 404 to a mobile machine (if any are present) the beacon's beacon data.

After broadcasting, a typical beacon might simply loop back to computing new 402 (if needed) cryptographic information. However, in the illustrated embodiment, the beacon instead tests to see if 406 it is receiving an incoming connection. If yes then the beacon starts to identify the nature of the incoming connection. It will be appreciated a variety of maintenance and/or custom operating modes may be used. For example, a test may be made to determine if 408 the beacon is being asked to enter an update mode 410. It will be appreciated if a beacon is configured with a long lasting power source, is wired to power, has solar power, etc., then it would be convenient to not have to travel to a beacon simply to update it. Reasons for updating could be firmware updating/optimizing, replacing cryptographic functions and/or associated keys (such as may be required if keys are stolen), etc. Instead, in one embodiment a large scale broadcast is made to a region to instruct beacons to update, and this is performed in the update mode. In an alternate embodiment, other equipment that is known to travel past beacons may be used to update them opportunistically.

For example, since beacons at bus stops will regularly have buses pass by, the bus may have equipment for calling out to beacons as the bus is stopping at a bus stop, and while near the beacon the bus may trigger an update. Or, in an arena, a drone or other mobile device may be tasked with coming into range of a beacon and updating it. It will be appreciated that while wireless communication is convenient, communication may be by way of a physical connection. In one embodiment, the physical communication is through induction, e.g., in the drone example the drone might land on the beacon/beacon's surrounding structure and inductively communicate an update. Regardless of the communication technique employed, while communicating, a beacon may be queried for statistics about its operation, such as the number of times the beacon has had operational trouble, power failures, or other indicia of impending failure. In addition, any interactive sessions with the beacon may be logged.

Another activity as discussed above is engaging in a VIP mode. While it may be appreciated the proxy may dynamically redirect a mobile device based on its characteristics (e.g., all Brand X mobile phones get a special discount from a Brand X beacon), or identity. Therefore, another test is to determine if 412 VIP is desired, and if so, then the beacon can take appropriate action, such as to broadcast 414 a VIP beacon data that may direct the mobile machine to a special proxy or other network location. The beacon may take other action or interaction (not illustrated) if desired, including providing the mobile machine with special credentials for future communication with the beacon or proxy. It will be appreciated if a mobile machine has a VIP certificate, since a beacon may be broadcasting with a HTTPS certificate and hence communicating using a public certificate, the mobile machine may disregard that public-user certificate and instead contact the beacon with a private certificate to trigger a VIP response such as to broadcast 414 the VIP beacon data. It will be appreciated these are simply two exemplary interactive engagements with a beacon, and that the beacon may continue to check if 416 other actions (not illustrated), such as interactive password based access, are to be performed, and if so the beacon performs 418 these actions. After all activity has been reviewed, processing may loop 420 back to updating the cryptographic information as needed.

Figure 5:
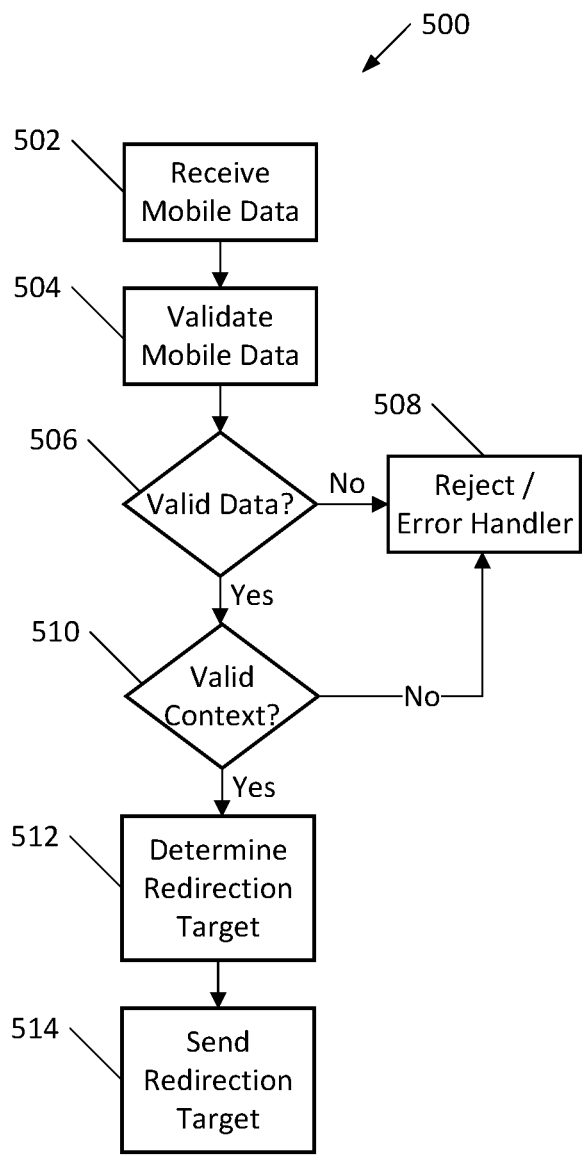
FIG. 5 illustrates an exemplary environment 500.

FIG. 5 illustrates an exemplary environment 500 illustrating communication from the perspective of a proxy, and roughly corresponding to FIG. 2 items 214-218. For illustrative purposes it is assumed that the proxy is a physical web proxy (see, e.g., FIG. 1 item 116), but it will be appreciated that other types of proxies and/or networking devices may perform the techniques discussed herein. As illustrated, the proxy is assumed to have one or more communication paths, each of which may maintain one or more communication sessions with multiple machines utilizing the proxy. The proxy to be communicatively coupled over a first communication path with a mobile machine, such as by way of a data network which may include the Internet. The mobile machine may be at least temporarily be or to communicate with a beacon broadcasting beacon data to the mobile machine (see, e.g., the FIG. 2 discussion) over a second communication path, which may be by way of Bluetooth Low Energy (BLE) as discussed above, or by way of other communication technology. It will be appreciated at time progresses different communication technology may be implemented and used without departing from the applicability of the teachings herein.

After receiving 502 mobile data from a mobile machine, the proxy may validate 504 the received data. As discussed above (See, e.g., FIG. 2 item 208), various cryptographic and/or other security features may be employed to ensure that the contact from the mobile machine is valid. This can help rule out mistaken access of the proxy, rogue beacons attempting to manipulate the proxy, etc. Thus, for example, the proxy may perform a cryptographic signature verification, or decryption of some or all of the mobile data as needed. Alternatively, the proxy might check an embedded or associated sequence number in the mobile data to validate it is the correct type of sequence, or in an expected value range, etc. If 506 validation suggests the contact is invalid, then the contact may be rejected 508 and/or an error handler invoked.

If 506 the mobile data is valid, then a context analyzer may check 510 the context for the contact. Some embodiments may, in addition to other security checking, sanity check the contact to make sure it is reasonable to have received the contact. For example, the proxy may review the timing of the contact, so, for example, if the proxy knows the beacon is associated with a location that is closed, then the contact may be considered suspicious and action taken to investigate and/or otherwise address it. In addition to time of day, the proxy may also look to frequency of contact, e.g., how many times a particular mobile machine is seen by a proxy, or how many contacts appear to be originated by a specific beacon, and if the contact falls outside expectations then this can trigger investigation for beacon error/failure, rogue beacons or machines attempting to compromise the environment, etc. Still further, the proxy may look to the type of the mobile machine in comparison to the service offered by the beacon, and verify that it makes sense for the mobile device to be contacting the beacon. It will be appreciated that these are merely exemplary contexts to consider and that others may be used. If 510 the context is not determined to be valid, then the contact may be rejected 508 and/or an error handler invoked.

However, if 506 the mobile data is valid, and if 510 the context is valid, then the proxy may determine a redirection target. As discussed above, various considerations may factor into selecting the redirection target, such as the context, calendared events (either associated with the mobile device, or public holidays and/or events), some combination of these or based on other criteria, including proximity of any of these to the beacon giving rise to the contact with the proxy. Based on such considerations, the proxy determines 512 the redirection target. It will be appreciated that the proxy may maintain, or have access to, a data store (such as a database, cloud-based storage, etc.) to one or more targets. Assuming the proxy has access to multiple redirection targets, it will be appreciated the proxy may dynamically select a target based on the context and other considerations associated with the proxy and/or characteristics of the mobile machine and/or a status (e.g., VIP) associated with the mobile machine.

Once a redirection target is determined 512 the redirection target may be sent 514 to the mobile machine for its processing. It will be appreciated that over time different technologies may be employed to identify the proxy to which a mobile machine should be directed, which in turn may dynamically redirect the mobile machine to a particular network resource. In one embodiment, it is assumed the beacon broadcasts a URL that the mobile machine can receive and access to be directed to the proxy. However, in another embodiment, the beacon instead broadcasts data that may be interpreted by the mobile machine, which may also include compiling, executing, and/or looking up data that in turn allows the mobile machine to access the proxy. Therefore in selected embodiments there is an idea of a correspondence between data broadcast by a beacon and the URL (or other data form subsequently developed to replace URLs) used by the mobile machine to contact the proxy. In the simplest case, the correspondence is direct, e.g., the beacon broadcasts a URL and that URL is directly used by the mobile machine to access the proxy. In another direct correspondence type of case, the beacon data includes a URL that is extracted from the beacon data by a mobile machine and used by the mobile machine to access the proxy. The various illustrated components, e.g., beacon, mobile machine, and/or proxy, may be configured to confirm a correspondence between beacon data and mobile data.

Figure 6:
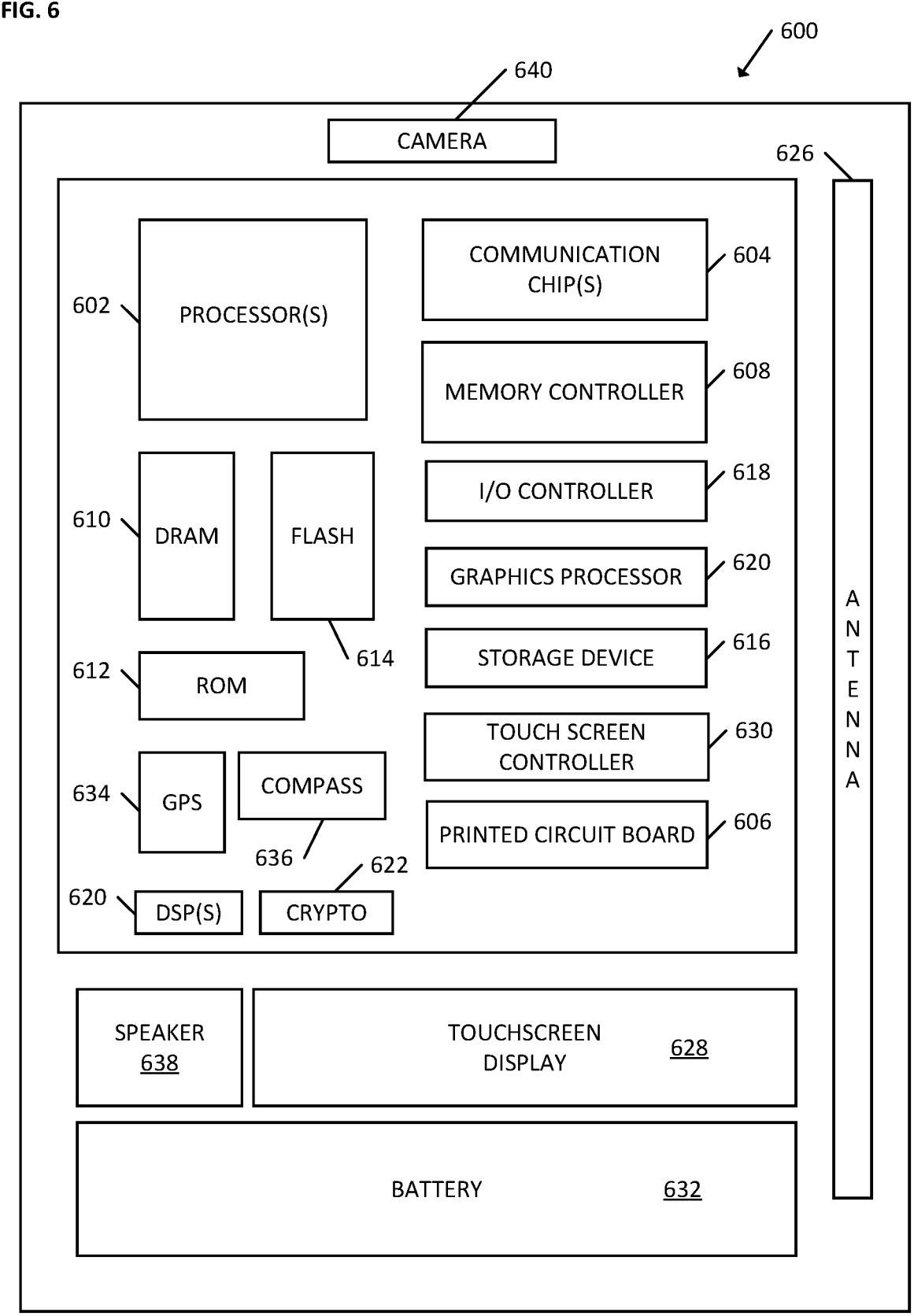
FIG. 6 illustrates an exemplary computer device 600 that may employ the apparatuses and/or methods described herein.

FIG. 6 illustrates an exemplary computer device 600 that may employ the apparatuses and/or methods described herein, in accordance with various embodiments. As shown, computer device 600 may include a number of components, such as one or more processor(s) 602 (one shown) and at least one communication chip(s) 604. In various embodiments, the one or more processor(s) 602 each may include one or more processor cores. In various embodiments, the at least one communication chip 604 may be physically and electrically coupled to the one or more processor(s) 602. In further implementations, the communication chip(s) 604 may be part of the one or more processor(s) 602. In various embodiments, computer device 600 may include printed circuit board (PCB) 606. For these embodiments, the one or more processor(s) 602 and communication chip(s) 604 may be disposed thereon. In alternate embodiments, the various components may be coupled without the employment of PCB 606.

Depending on its applications, computer device 600 may include other components that may or may not be physically and electrically coupled to the PCB 606. These other components include, but are not limited to, memory controller 608, volatile memory (e.g., dynamic random access memory (DRAM) 610), non-volatile memory such as read only memory (ROM) 612, flash memory 614, storage device 616 (e.g., a hard-disk drive (HDD)), an I/O controller 618, a digital signal processor 620, a crypto processor 622, a graphics processor 624 (e.g., a graphics processing unit (GPU) or other circuitry for performing graphics), one or more antenna 626, a display which may be or work in conjunction with a touch screen display 628, a touch screen controller 630, a battery 632, an audio codec (not shown), a video codec (not shown), a positioning system such as a global positioning system (GPS) device 634 (it will be appreciated other location technology may be used), a compass 636, an accelerometer (not shown), a gyroscope (not shown), a speaker 638, a camera 640, and other mass storage devices (such as hard disk drive, a solid state drive, compact disk (CD), digital versatile disk (DVD)) (not shown), and so forth.

In some embodiments, the one or more processor(s) 602, flash memory 614, and/or storage device 616 may include associated firmware (not shown) storing programming instructions configured to enable computer device 600, in response to execution of the programming instructions by one or more processor(s) 602, to practice all or selected aspects of the methods described herein. In various embodiments, these aspects may additionally or alternatively be implemented using hardware separate from the one or more processor(s) 602, flash memory 614, or storage device 616. In one embodiment, memory, such as flash memory 614 or other memory in the computer device, is or may include a memory device that is a block addressable memory device, such as those based on NAND or NOR technologies. A memory device may also include future generation nonvolatile devices, such as a three dimensional crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In various embodiments, one or more components of the computer device 600 may implement an embodiment of, for example, the FIG. 1 beacon 102, mobile machine 108 or proxy 116, etc. Thus for example processor 602 could correspond to operation of the FIG. 1 proxy communicating with memory 610 though memory controller 608. In some embodiments, I/O controller 618 may interface with one or more external devices to receive a data. Additionally, or alternatively, the external devices may be used to receive a data signal transmitted between components of the computer device 600.

The communication chip(s) 604 may enable wired and/or wireless communications for the transfer of data to and from the computer device 600. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip(s) may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device may include a plurality of communication chips 604. For instance, a first communication chip(s) may be dedicated to shorter range wireless communications such as Wi-Fi and Bluetooth, and a second communication chip 604 may be dedicated to longer range wireless communications such as GPS, EDGE, GPRS, CDMA, WiMAX, LTE, Ev-DO, and others.

The communication chip(s) may implement any number of standards, protocols, and/or technologies datacenters typically use, such as networking technology providing high-speed low latency communication. For example, the communication chip(s) may support RoCE (Remote Direct Memory Access (RDMA) over Converged Ethernet), e.g., version 1 or 2, which is a routable protocol having efficient data transfers across a network, and is discussed for example at Internet URL RDMAconsortium.com. The chip(s) may support Fibre Channel over Ethernet (FCoE), iWARP, or other high-speed communication technology, see for example the OpenFabrics Enterprise Distribution (OFED™) documentation available at Internet URL OpenFabrics.org. It will be appreciated datacenter environments benefit from highly efficient networks, storage connectivity and scalability, e.g., Storage Area Networks (SANS), parallel computing using RDMA, Internet Wide Area Remote Protocol (iWARP), InfiniBand Architecture (IBA), and other such technology. Computer device 600 may support any of the infrastructures, protocols and technology identified here, and since new high-speed technology is always being implemented, it will be appreciated by one skilled in the art that the computer device is expected to support equivalents currently known or technology implemented in future.

In various implementations, the computer device 600 may be a laptop, a netbook, a notebook, an ultrabook, a smartphone, a computer tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an appliance, a portable music player, or a digital video recorder, or a transportation device (e.g., any motorized or manual device such as a bicycle, motorcycle, automobile, taxi, train, plane, etc.). In further implementations, the computer device 600 may be any other electronic device that processes data.

Figure 7:
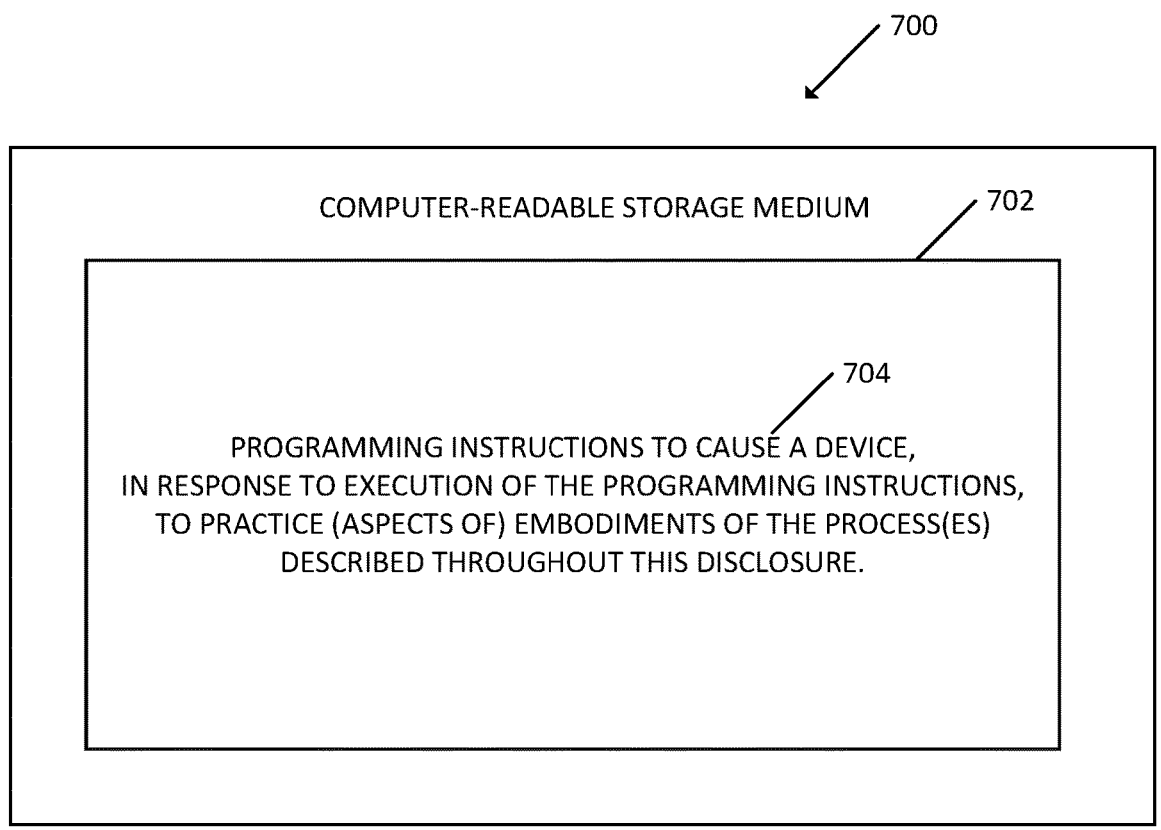
FIG. 7 illustrates an exemplary computer-readable storage medium 700.

FIG. 7 illustrates an exemplary computer-readable storage medium 700. The storage medium may be transitory, non-transitory or a combination of transitory and non-transitory media, and the medium may be suitable for use to store instructions that cause an apparatus, machine or other device, in response to execution of the instructions by the apparatus, to practice selected aspects of the present disclosure. As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. As shown, non-transitory computer-readable storage medium 702 may include a number of programming instructions 704. Programming instructions 704 may be configured to enable a device, e.g., computer device 600, in response to execution of the programming instructions, to implement (aspects of) technology disclosed herein. In alternate embodiments, programming instructions 704 may be disposed on multiple computer-readable non-transitory storage media 702 instead. In still other embodiments, programming instructions 704 may be disposed on computer-readable transitory storage media 702, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Cooperative program execution may be for a fee based on a commercial transaction, such as a negotiated rate (offer/accept) arrangement, established and/or customary rates, and may include micropayments between device(s) cooperatively executing the program or storing and/or managing associated data.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which are executed provide processes for implementing the functions/acts specified in the flowchart and/or block diagram block or blocks.

Figure 8:
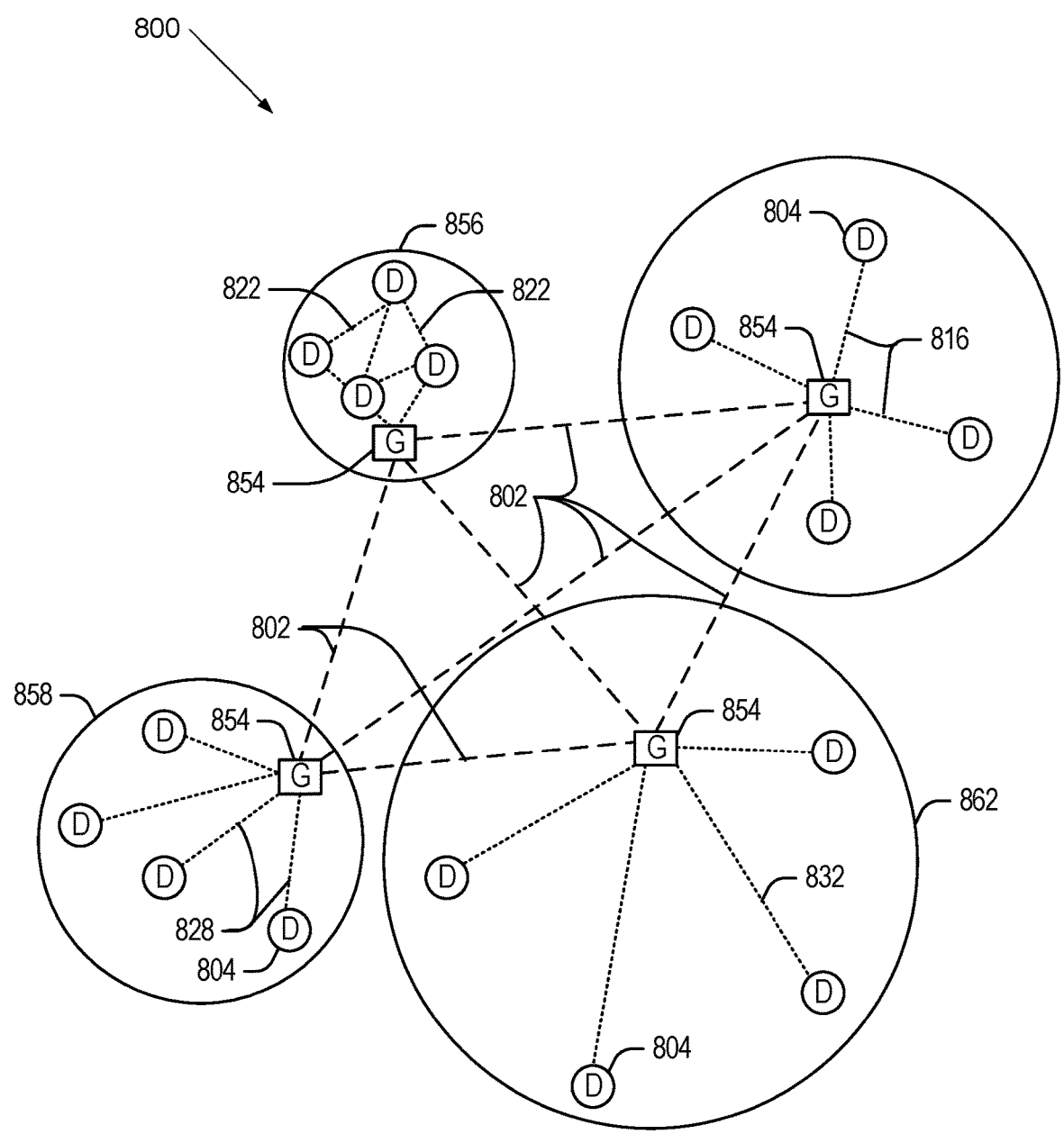
FIG. 8 illustrates a block diagram of a network 800 illustrating communications among a number of IoT devices, according to an example.

FIG. 8 illustrates an example domain topology 800 for respective internet-of-things (IoT) networks coupled through links to respective gateways. The Internet of Things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 9:
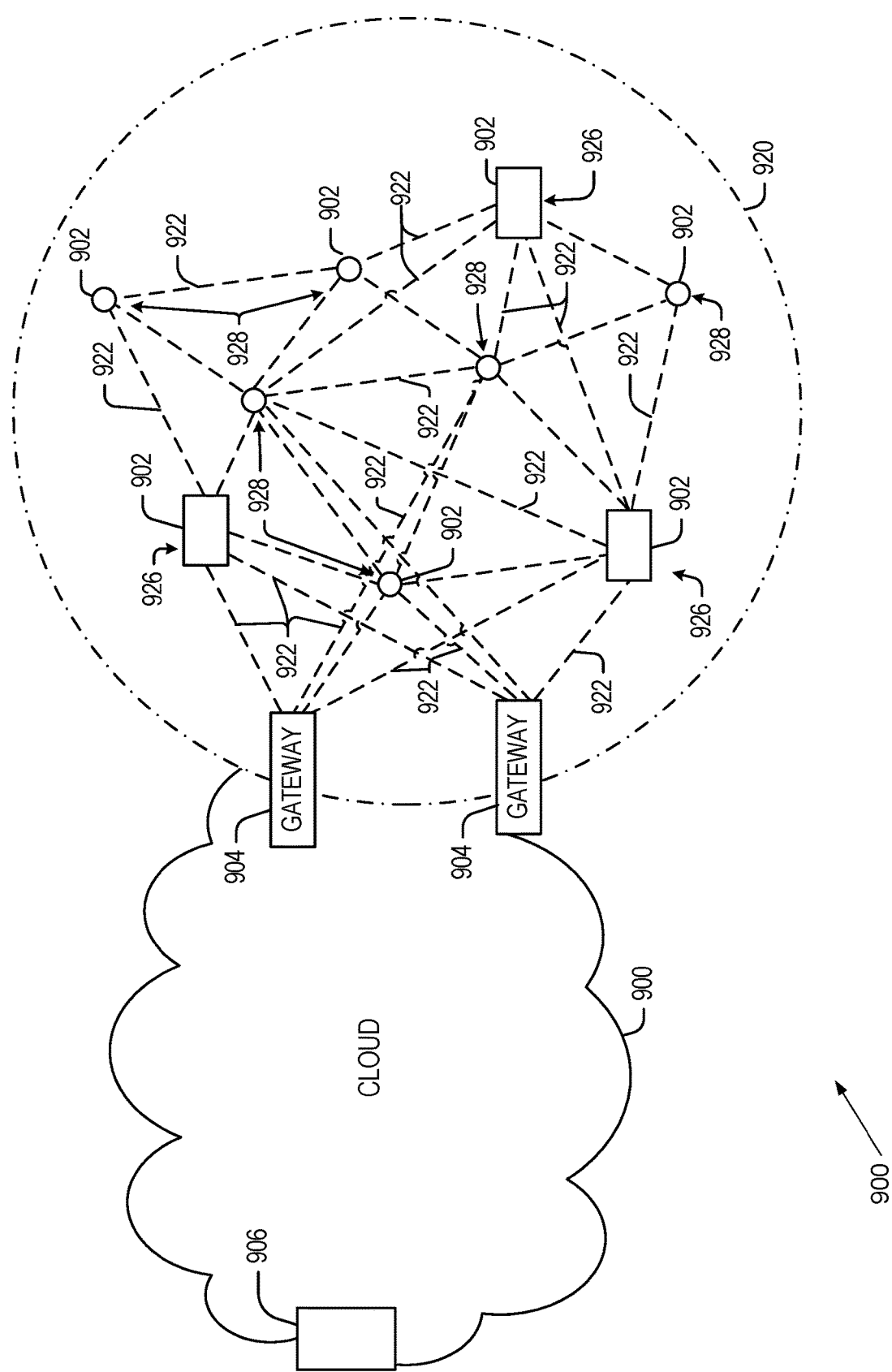
FIG. 9 illustrates a block diagram for an example IoT processing system architecture 900 upon which any one or more of the techniques (e.g., operations, processes, methods, and methodologies) discussed herein may be performed, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 8 and 9, present a number of new challenges in a heterogeneous network of connectivity comprising a combination of wired and wireless technologies.

FIG. 8 specifically provides a simplified drawing of a domain topology that may be used for a number of internet-of-things (IoT) networks comprising IoT devices 804, with the IoT networks 856, 858, 860, 862, coupled through backbone links 802 to respective gateways 854. For example, a number of IoT devices 804 may communicate with a gateway 854, and with each other through the gateway 854. To simplify the drawing, not every IoT device 804, or communications link (e.g., link 816, 822, 828, or 832) is labeled. The backbone links 802 may include any number of wired or wireless technologies, including optical networks, and may be part of a local area network (LAN), a wide area network (WAN), or the Internet. Additionally, such communication links facilitate optical signal paths among both IoT devices 804 and gateways 854, including the use of MUXing/deMUXing components that facilitate interconnection of the various devices.

The network topology may include any number of types of IoT networks, such as a mesh network provided with the network 856 using Bluetooth low energy (BLE) links 822. Other types of IoT networks that may be present include a wireless local area network (WLAN) network 858 used to communicate with IoT devices 804 through IEEE 802.8 (Wi-Fi®) links 828, a cellular network 860 used to communicate with IoT devices 804 through an LTE/LTE-A (4G) or 5G cellular network, and a low-power wide area (LPWA) network 862, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 804, such as over the backbone links 802, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 856, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 858, for instance, may use systems that perform standards conversion to provide multi-standard connectivity, enabling IoT devices 804 using different protocols to communicate. Further systems may provide seamless interconnectivity across a multi-standard infrastructure comprising visible Internet resources and hidden Internet resources.

Communications in the cellular network 860, for instance, may be enhanced by systems that offload data, extend communications to more remote devices, or both. The LPWA network 862 may include systems that perform non-Internet protocol (IP) to IP interconnections, addressing, and routing. Further, each of the IoT devices 804 may include the appropriate transceiver for wide area communications with that device. Further, each IoT device 804 may include other transceivers for communications using additional protocols and frequencies. This is discussed further with respect to the communication environment and hardware of an IoT processing device depicted in other illustrated embodiments.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 9 below.

FIG. 9 illustrates a cloud computing network in communication with a mesh network of IoT devices (devices 902) operating as a fog device at the edge of the cloud computing network. The mesh network of IoT devices may be termed a fog 920, operating at the edge of the cloud 900. To simplify the diagram, not every IoT device 902 is labeled.

The fog 920 may be considered to be a massively interconnected network wherein a number of IoT devices 902 are in communications with each other, for example, by radio links 922. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 902 are shown in this example, gateways 904, data aggregators 926, and sensors 928, although any combinations of IoT devices 902 and functionality may be used. The gateways 904 may be edge devices that provide communications between the cloud 900 and the fog 920, and may also provide the backend process function for data obtained from sensors 928, such as motion data, flow data, temperature data, and the like. The data aggregators 926 may collect data from any number of the sensors 928, and perform the back end processing function for the analysis. The results, raw data, or both may be passed along to the cloud 900 through the gateways 904. The sensors 928 may be full IoT devices 902, for example, capable of both collecting data and processing the data. In some cases, the sensors 928 may be more limited in functionality, for example, collecting the data and allowing the data aggregators 926 or gateways 904 to process the data.

Communications from any IoT device 902 may be passed along a convenient path (e.g., a most convenient path) between any of the IoT devices 902 to reach the gateways 904. In these networks, the number of interconnections provide substantial redundancy, allowing communications to be maintained, even with the loss of a number of IoT devices 902. Further, the use of a mesh network may allow IoT devices 902 that are very low power or located at a distance from infrastructure to be used, as the range to connect to another IoT device 902 may be much less than the range to connect to the gateways 904.

The fog 920 provided from these IoT devices 902 may be presented to devices in the cloud 900, such as a server 906, as a single device located at the edge of the cloud 900, e.g., a fog device. In this example, the alerts coming from the fog device may be sent without being identified as coming from a specific IoT device 902 within the fog 920. In this fashion, the fog 920 may be considered a distributed platform that provides computing and storage resources to perform processing or data-intensive tasks such as data analytics, data aggregation, and machine-learning, among others.

In some examples, the IoT devices 902 may be configured using an imperative programming style, e.g., with each IoT device 902 having a specific function and communication partners. However, the IoT devices 902 forming the fog device may be configured in a declarative programming style, allowing the IoT devices 902 to reconfigure their operations and communications, such as to determine needed resources in response to conditions, queries, and device failures. As an example, a query from a user located at a server 906 about the operations of a subset of equipment monitored by the IoT devices 902 may result in the fog 920 device selecting the IoT devices 902, such as particular sensors 928, needed to answer the query. The data from these sensors 928 may then be aggregated and analyzed by any combination of the sensors 928, data aggregators 926, or gateways 904, before being sent on by the fog 920 device to the server 906 to answer the query. In this example, IoT devices 902 in the fog 920 may select the sensors 928 used based on the query, such as adding data from flow sensors or temperature sensors. Further, if some of the IoT devices 902 are not operational, other IoT devices 902 in the fog 920 device may provide analogous data, if available.

In other examples, the operations and functionality described above may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 10:
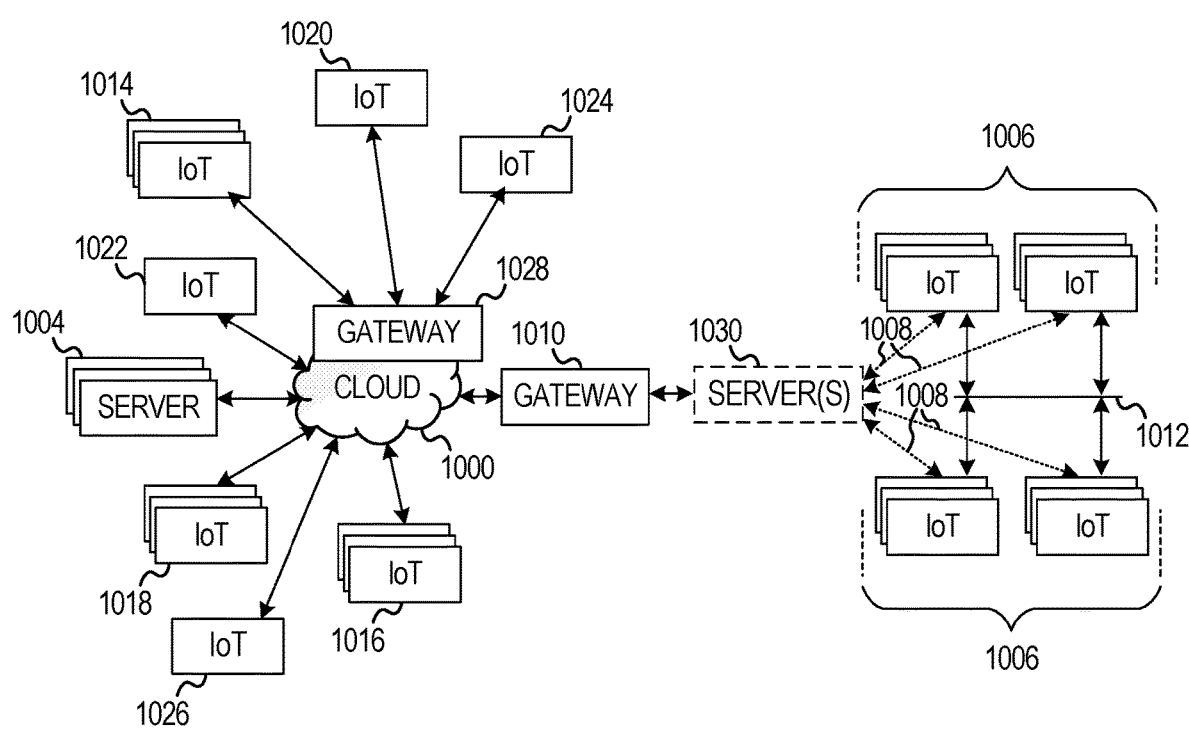
FIG. 10 illustrates a block diagram of a network illustrating communications among a number of IoT devices, according to an example.

FIG. 10 illustrates a drawing of a cloud computing network, or cloud 1000, in communication with a number of Internet of Things (IoT) devices. The cloud 1000 may represent the Internet, or may be a local area network (LAN), or a wide area network (WAN), such as a proprietary network for a company. The IoT devices may include any number of different types of devices, grouped in various combinations. For example, a traffic control group 1006 may include IoT devices along streets in a city. These IoT devices may include stoplights, traffic flow monitors, cameras, weather sensors, and the like. The traffic control group 1006, or other subgroups, may be in communication with the cloud 1000 through wired or wireless links 1008, such as LPWA links, optical links, and the like. Further, a wired or wireless sub-network 1012 may allow the IoT devices to communicate with each other, such as through a local area network, a wireless local area network, and the like. The IoT devices may use another device, such as a gateway 1010 or 1028 to communicate with remote locations such as the cloud 1000; the IoT devices may also use one or more servers 1030 to facilitate communication with the cloud 1000 or with the gateway 1010. For example, the one or more servers 1030 may operate as an intermediate network node to support a local edge cloud or fog implementation among a local area network. Further, the gateway 1028 that is depicted may operate in a cloud-to-gateway-to-many edge devices configuration, such as with the various IoT devices 1014, 1020, 1024 being constrained or dynamic to an assignment and use of resources in the cloud 1000.

Other example groups of IoT devices may include remote weather stations 1014, local information terminals 1016, alarm systems 1018, automated teller machines 1020, alarm panels 1022, or moving vehicles, such as emergency vehicles 1024 or other vehicles 1026, among many others. Each of these IoT devices may be in communication with other IoT devices, with servers 1004, with another IoT fog device or system (not shown, but depicted in FIG. 9), or a combination therein. The groups of IoT devices may be deployed in various residential, commercial, and industrial settings (including in both private or public environments).

As can be seen from FIG. 10, a large number of IoT devices may be communicating through the cloud 1000. This may allow different IoT devices to request or provide information to other devices autonomously. For example, a group of IoT devices (e.g., the traffic control group 1006) may request a current weather forecast from a group of remote weather stations 1014, which may provide the forecast without human intervention. Further, an emergency vehicle 1024 may be alerted by an automated teller machine 1020 that a burglary is in progress. As the emergency vehicle 1024 proceeds towards the automated teller machine 1020, it may access the traffic control group 1006 to request clearance to the location, for example, by lights turning red to block cross traffic at an intersection in sufficient time for the emergency vehicle 1024 to have unimpeded access to the intersection.

Clusters of IoT devices, such as the remote weather stations 1014 or the traffic control group 1006, may be equipped to communicate with other IoT devices as well as with the cloud 1000. This may allow the IoT devices to form an ad-hoc network between the devices, allowing them to function as a single device, which may be termed a fog device or system (e.g., as described above with reference to FIG. 9).

Figure 11:
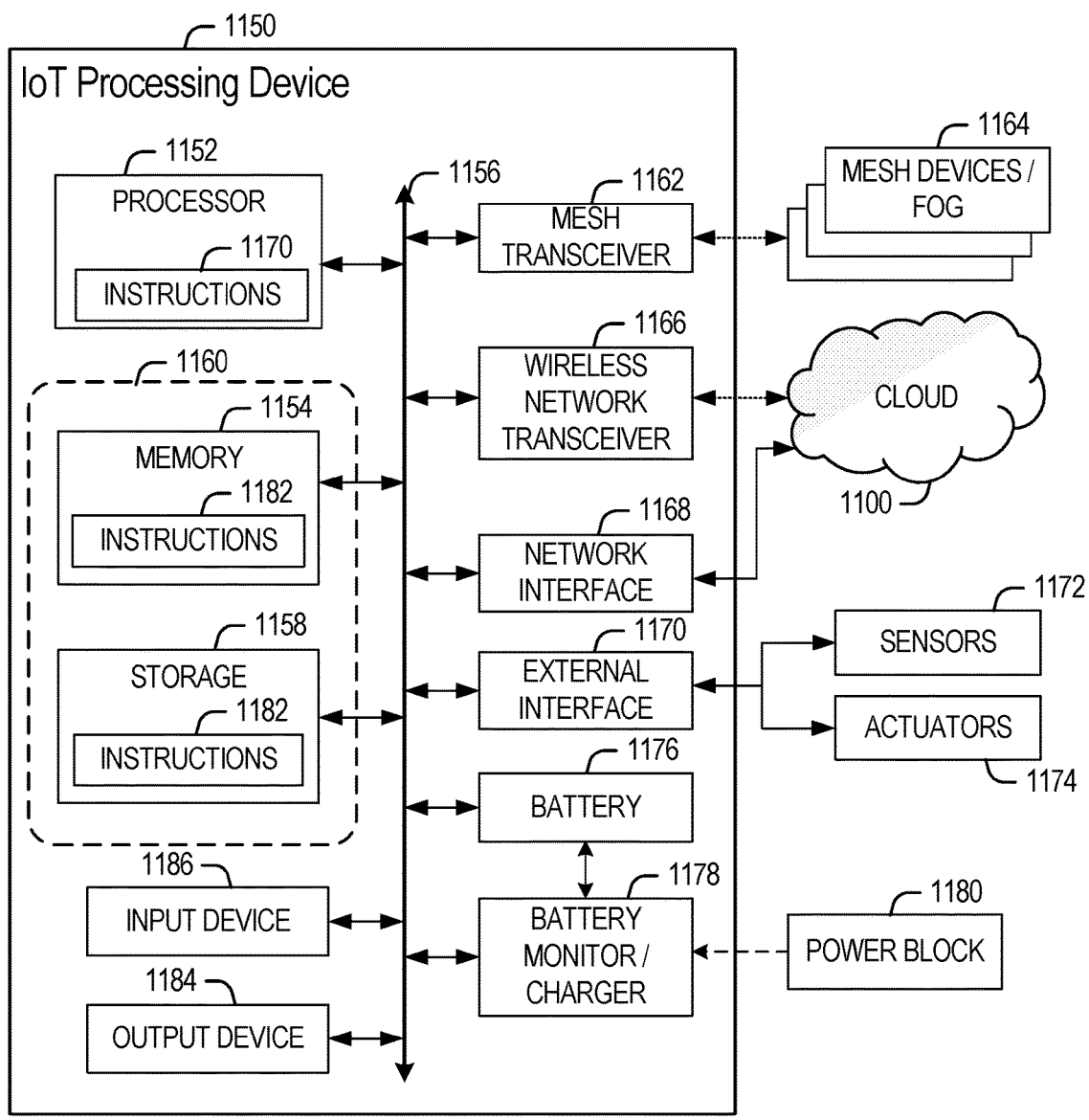
FIG. 11 illustrates a block diagram for an example IoT processing system architecture upon which any one or more of the techniques (e.g., operations, processes, methods, and methodologies) discussed herein may be performed, according to an example.

FIG. 11 is a block diagram of an example of components that may be present in an IoT device 1150 for implementing the techniques described herein. The IoT device 1150 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1150, or as components otherwise incorporated within a chassis of a larger system. Additionally, the block diagram of FIG. 11 is intended to depict a high-level view of components of the IoT device 1150. However, some of the components shown may be omitted, additional components may be present, and different arrangement of the components shown may occur in other implementations.

The IoT device 1150 may include a processor 1152, which may be a microprocessor, a multi-core processor, a multi-threaded processor, an ultra-low voltage processor, an embedded processor, or other known processing element. The processor 1152 may be a part of a system on a chip (SoC) in which the processor 1152 and other components are formed into a single integrated circuit, or a single package, such as the Edison™ or Galileo™ SoC boards from Intel. As an example, the processor 1152 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1152 may communicate with a system memory 1154 over an interconnect 1156 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1158 may also couple to the processor 1152 via the interconnect 1156. In an example the storage 1158 may be implemented via a solid state disk drive (SSDD). Other devices that may be used for the storage 1158 include flash memory cards, such as SD cards, microSD cards, xD picture cards, and the like, and USB flash drives. In low power implementations, the storage 1158 may be on-die memory or registers associated with the processor 1152. However, in some examples, the storage 1158 may be implemented using a micro hard disk drive (HDD). Further, any number of new technologies may be used for the storage 1158 in addition to, or instead of, the technologies described, such resistance change memories, phase change memories, holographic memories, or chemical memories, among others.

The components may communicate over the interconnect 1156. The interconnect 1156 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1156 may be a proprietary bus, for example, used in a SoC based system. Other bus systems may be included, such as an I2C interface, an SPI interface, point to point interfaces, and a power bus, among others.

The interconnect 1156 may couple the processor 1152 to a mesh transceiver 1162, for communications with other mesh devices 1164. The mesh transceiver 1162 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1164. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1162 may communicate using multiple standards or radios for communications at different range. For example, the IoT device 1150 may communicate with close devices, e.g., within about 10 meters, using a local transceiver based on BLE, or another low power radio, to save power. More distant mesh devices 1164, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1166 may be included to communicate with devices or services in the cloud 1100 via local or wide area network protocols. The wireless network transceiver 1166 may be a LPWA transceiver that follows the IEEE 802.15.4, or IEEE 802.15.4g standards, among others. The IoT device 1150 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1162 and wireless network transceiver 1166, as described herein. For example, the radio transceivers 1162 and 1166 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1162 and 1166 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1166, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1168 may be included to provide a wired communication to the cloud 1100 or to other devices, such as the mesh devices 1164. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1168 may be included to allow connect to a second network, for example, a NIC 1168 providing communications to the cloud over Ethernet, and a second NIC 1168 providing communications to other devices over another type of network.

The interconnect 1156 may couple the processor 1152 to an external interface 1170 that is used to connect external devices or subsystems. The external devices may include sensors 1172, such as accelerometers, level sensors, flow sensors, optical light sensors, camera sensors, temperature sensors, a global positioning system (GPS) sensors, pressure sensors, barometric pressure sensors, and the like. The external interface 1170 further may be used to connect the IoT device 1150 to actuators 1174, such as power switches, valve actuators, an audible sound generator, a visual warning device, and the like.

In some optional examples, various input/output (I/O) devices may be present within, or connected to, the IoT device 1150. For example, a display or other output device 1184 may be included to show information, such as sensor readings or actuator position. An input device 1186, such as a touch screen or keypad may be included to accept input. An output device 1184 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1150.

A battery 1176 may power the IoT device 1150, although in examples in which the IoT device 1150 is mounted in a fixed location, it may have a power supply coupled to an electrical grid. The battery 1176 may be a lithium ion battery, or a metal-air battery, such as a zinc-air battery, an aluminum-air battery, a lithium-air battery, and the like.

A battery monitor/charger 1178 may be included in the IoT device 1150 to track the state of charge (SoCh) of the battery 1176. The battery monitor/charger 1178 may be used to monitor other parameters of the battery 1176 to provide failure predictions, such as the state of health (SoH) and the state of function (SoF) of the battery 1176. The battery monitor/charger 1178 may include a battery monitoring integrated circuit, such as an LTC4020 or an LTC2990 from Linear Technologies, an ADT7488A from ON Semiconductor of Phoenix, Ariz., or an IC from the UCD90xxx family from Texas Instruments of Dallas, Tex. The battery monitor/charger 1178 may communicate the information on the battery 1176 to the processor 1152 over the interconnect 1156. The battery monitor/charger 1178 may also include an analog-to-digital (ADC) convertor that allows the processor 1152 to monitor directly the voltage of the battery 1176 or the current flow from the battery 1176. The battery parameters may be used to determine actions that the IoT device 1150 may perform, such as transmission frequency, mesh network operation, sensing frequency, and the like.

A power block 1180, or other power supply coupled to a grid, may be coupled with the battery monitor/charger 1178 to charge the battery 1176. In some examples, the power block 1180 may be replaced with a wireless power receiver to obtain the power wirelessly, for example, through a loop antenna in the IoT device 1150. A wireless battery charging circuit, such as an LTC4020 chip from Linear Technologies of Milpitas, Calif., among others, may be included in the battery monitor/charger 1178. The specific charging circuits chosen depend on the size of the battery 1176, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1158 may include instructions 1182 in the form of software, firmware, or hardware commands to implement the techniques described herein. Although such instructions 1182 are shown as code blocks included in the memory 1154 and the storage 1158, it may be understood that any of the code blocks may be replaced with hardwired circuits, for example, built into an application specific integrated circuit (ASIC).

In an example, the instructions 1182 provided via the memory 1154, the storage 1158, or the processor 1152 may be embodied as a non-transitory, machine readable medium 1160 including code to direct the processor 1152 to perform electronic operations in the IoT device 1150. The processor 1152 may access the non-transitory, machine readable medium 1160 over the interconnect 1156. For instance, the non-transitory, machine readable medium 1160 may be embodied by devices described for the storage 1158 of FIG. 11 or may include specific storage units such as optical disks, flash drives, or any number of other hardware devices. The non-transitory, machine readable medium 1160 may include instructions to direct the processor 1152 to perform a specific sequence or flow of actions, for example, as described with respect to the flowchart(s) and block diagram (s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions. Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 may be a proxy for at least the physical-web, the proxy to communicate over a first communication path with a mobile machine, the mobile machine at least temporarily to communicate with a beacon broadcasting beacon data to the mobile machine over a second communication path, the proxy comprising: the first communication path to receive mobile data from the mobile machine; a security module to at least validate the mobile data corresponds to the beacon data; a context analyzer to validate the mobile data complies with a context for the beacon; a redirector to send a redirection to the mobile machine based at least in part on the mobile data; and a data store to store an at least one target for the redirector, wherein the data store may dynamically change the redirection to a selected one of the at least one target based at least in part on the context for the beacon.

Example 2 may be the proxy of example 1, in which the beacon has an associated security feature, wherein the security module validates the mobile data based at least in part on the security feature.

Example 3 may be the proxy of example 2, wherein: the security feature includes an encoding operation of at least a portion of the beacon data in accord with a cryptosystem; and the security module validates the mobile data by at least applying a verification operation of the cryptosystem that corresponds to the encoding operation.

Example 4 may be example 3, wherein the encoding operation is a selected one of: a public key cryptosystem (PKI) signing of the at least a portion of the beacon data; or a PKI encryption of the at least a portion of the beacon data.

Example 5 may be example 1, in which the beacon data includes a first uniform resource locator (URL) broadcast by the beacon, the proxy further comprising: a search module to determine if a second URL is in the mobile data; a comparison module to determine if the second URL corresponds to the first URL; a database storing at least one known URL associated with at least the beacon; wherein the context for the beacon includes the second URL being in the database storing the at least one known URL.

Example 6 may be example 1, wherein the context analyzer validates the beacon data against an expectation of contact from devices receiving the beacon data.

Example 7 may be example 6, wherein the expectation includes receiving the mobile data during an in-service time associated with the beacon.

Example 8 may be example 1, wherein the redirector selects the redirection from the data store based at least in part on an event selected from potential events associated with the beacon, the potential events including at least a holiday, or an entertainment event proximate to the beacon.

Example 8 may be a physical-web beacon to communicate over a first network with a mobile machine, to communicate over a second network with a management device, the mobile machine to communicate with a proxy to redirect the mobile machine to a network resource on a second network based at least in part on data provided over the first network, the beacon comprising: a first communication interface path to broadcast a beacon data to the mobile machine over the first network; a second communication interface to receive an update from the management device over the second network, the update encoded in accord with a cryptosystem; a context analyzer to at least determine a context for the beacon; and a security module to at least validate the update from the management device based on the context.

Example 10 may be example 9, wherein the validate the update is also based at least in part on the cryptosystem.

Example 11 may be example 9, wherein the cryptosystem includes an encoding operation that is a selected one of: a public key cryptosystem (PKI) signing of the at least a portion of the beacon data; or a PKI encryption of the at least a portion of the beacon data.

Example 12 may be example 9, wherein the beacon data includes a first uniform resource locator (URL); and the beacon data is arranged so as to be parseable by the proxy to facilitate the proxy to identify the first URL and based thereon to perform the redirect of the mobile machine to a second URL.

Example 13 may be example 9, wherein the context analyzer may monitor contact with the beacon against an expectation of contact from devices, and may log an exception if the expectation is not met.

Example 11 may be example 13, wherein the expectation includes whether contact is received during an in-service time associated with the beacon.

Example 15 may be a method for a proxy to communicate over a first network with a mobile machine, the mobile machine at least temporarily to communicate with a beacon for the physical-web broadcasting beacon data to the mobile machine, the method comprising: receiving the mobile data from the mobile machine; validating the mobile data corresponds to the beacon data; validating the mobile data complies with a context for the beacon; dynamically selecting a redirection target from a data store based at least in part on the mobile data and based at least in part on the context for the beacon; and redirecting the mobile machine based to the redirection target.

Example 16 may be example 15, in which the beacon has an associated security feature, the validating the mobile data further comprising: performing the validating the mobile data based at least in part on the security feature.

Example 17 may be example 16, wherein: the security feature includes an encoding operation of at least a portion of the beacon data in accord with a cryptosystem; and the security module validates the mobile data by at least applying a verification operation of the cryptosystem that corresponds to the encoding operation.

Example 18 may be example 17, wherein the encoding operation is a selected one of: a public key cryptosystem (PKI) signing of the at least a portion of the beacon data; or a PKI encryption of the at least a portion of the beacon data.

Example 19 may be example 15, in which the beacon data includes a first uniform resource locator (URL) broadcast by the beacon, further comprising: searching for a second URL in the mobile data; determining if the second URL corresponds to the first URL; and validating the mobile data satisfies an expectation of contact from the mobile device, wherein the expectation includes receiving the mobile data during an in-service time associated with the beacon.

Example 20 may be example 19, further comprising: setting the redirection target to URL determined based on the second URL.

Example 21 may be one or more non-transitory computer-readable media having instructions for a proxy to communicate over a first network with a mobile machine, the mobile machine at least temporarily to communicate with a beacon for the physical-web broadcasting beacon data to the mobile machine, the instructions to provide for: receiving the mobile data from the mobile machine; validating the mobile data corresponds to the beacon data; validating the mobile data complies with a context for the beacon; dynamically selecting a redirection target from a data store based at least in part on the mobile data and based at least in part on the context for the beacon; and redirecting the mobile machine based to the redirection target.

Example 22 may be example 21 further including instructions to provide for: performing the validating the mobile data based at least in part on the security feature.

Example 23 may be example 22, wherein the instructions for: the security feature includes further instructions to provide for an encoding operation of at least a portion of the beacon data in accord with a cryptosystem; and the security module includes further instructions to provide for validating the mobile data by at least applying instructions for a verification operation of the cryptosystem that corresponds to the encoding operation.

Example 24 may be example 23, wherein the instructions to provide for the encoding operation includes instructions to provide for a selected one of: a public key cryptosystem (PKI) signing of the at least a portion of the beacon data; or a PKI encryption of the at least a portion of the beacon data.

Example 25 may be example 21, in which the beacon data includes a first uniform resource locator (URL) broadcast by the beacon, the instructions for the proxy further including instructions to provide for: searching for a second URL in the mobile data; determining if the second URL corresponds to the first URL; validating the mobile data satisfies an expectation of contact from the mobile device, wherein the expectation includes receiving the mobile data during an in-service time associated with the beacon; and setting the redirection target to URL determined based on the second URL.

Example 26 may be example any of examples 1-2, in which the beacon has an associated security feature, wherein the security feature includes an encoding operation of at least a portion of the beacon data in accord with a cryptosystem; and the security module validates the mobile data by at least applying a verification operation of the cryptosystem that corresponds to the encoding operation.

Example 27 may be example any of examples 1-4, in which the beacon data includes a first uniform resource locator (URL) broadcast by the beacon, the proxy further comprising: a search module to determine if a second URL is in the mobile data; a comparison module to determine if the second URL corresponds to the first URL; a database storing at least one known URL associated with at least the beacon; wherein the context for the beacon includes the second URL being in the database storing the at least one known URL.

Example 28 may be example any of examples 1-5, wherein the context analyzer validates the beacon data against an expectation of contact from devices receiving the beacon data.

Example 29 may be example any of examples 1-7, wherein the redirector selects the redirection from the data store based at least in part on an event selected from potential events associated with the beacon, the potential events including at least a holiday, or an entertainment event proximate to the beacon.

Example 30 may be example any of examples 9-10, wherein the cryptosystem includes an encoding operation that is a selected one of: a public key cryptosystem (PKI) signing of the at least a portion of the beacon data; or a PKI encryption of the at least a portion of the beacon data.

Example 31 may be example any of examples 9-11, wherein the beacon data includes a first uniform resource locator (URL); and the beacon data is arranged so as to be parseable by the proxy to facilitate the proxy to identify the first URL and based thereon to perform the redirect of the mobile machine to a second URL.

Example 32 may be example any of examples 9-12, wherein the context analyzer may monitor contact with the beacon against an expectation of contact from devices, and may log an exception if the expectation is not met.

Example 33 may be example any of examples 15-16, in which the beacon has an associated security feature, wherein: the security feature includes an encoding operation of at least a portion of the beacon data in accord with a cryptosystem; and the security module validates the mobile data by at least applying a verification operation of the cryptosystem that corresponds to the encoding operation.

Example 34 may be example any of examples 15-18, in which the beacon data includes a first uniform resource locator (URL) broadcast by the beacon, further comprising: searching for a second URL in the mobile data; determining if the second URL corresponds to the first URL; validating the mobile data satisfies an expectation of contact from the mobile device, wherein the expectation includes receiving the mobile data during an in-service time associated with the beacon; and setting the redirection target to URL determined based on the second URL.

Example 35 may be example any of examples 21-24, in which the beacon data includes a first uniform resource locator (URL) broadcast by the beacon, the instructions for the proxy further including instructions to provide for: searching for a second URL in the mobile data; determining if the second URL corresponds to the first URL; validating the mobile data satisfies an expectation of contact from the mobile device, wherein the expectation includes receiving the mobile data during an in-service time associated with the beacon; and setting the redirection target to URL determined based on the second URL.

Example 36 may be a method for a proxy to communicate over a first network with a mobile machine, the mobile machine at least temporarily to communicate with a beacon for the physical-web broadcasting beacon data to the mobile machine, the method comprising: means for receiving the mobile data from the mobile machine; means for validating the mobile data corresponds to the beacon data; means for validating the mobile data complies with a context for the beacon; means for dynamically selecting a redirection target from a data store based at least in part on the mobile data and based at least in part on the context for the beacon; and means for redirecting the mobile machine based to the redirection target.

Example 37 may be example 36, in which the beacon has an associated security feature, the validating the mobile data further comprising: means for performing the validating the mobile data based at least in part on the security feature.

Example 38 may be example 37, wherein: the security feature includes means for an encoding operation of at least a portion of the beacon data in accord with a cryptosystem; and the security module validates the mobile data by at least applying means for a verification operation of the cryptosystem that corresponds to the encoding operation.

Example 39 may be example 38, wherein the means for encoding operation is a selected one of: means for a public key cryptosystem (PKI) signing of the at least a portion of the beacon data; or means for a PKI encryption of the at least a portion of the beacon data.

Example 40 may be any of examples 36-39, in which the beacon data includes means for a first uniform resource locator (URL) broadcast by the beacon, further comprising: means for searching for a second URL in the mobile data; means for determining if the second URL corresponds to the first URL; means for validating the mobile data satisfies an expectation of contact from the mobile device, wherein the expectation includes receiving the mobile data during an in-service time associated with the beacon; and means for setting the redirection target to URL determined based on the second URL.

Example 41 may be a proxy for at least the physical-web, the proxy to communicate over means for a first communication path with a mobile machine, the mobile machine at least temporarily to communicate with a beacon broadcasting beacon data to the mobile machine over means for a second communication path, the proxy comprising: the first communication path to receive mobile data from the mobile machine; means for a security module to at least validate the mobile data corresponds to the beacon data; means for a context analyzer to validate the mobile data complies with a context for the beacon; means for a redirector to send a redirection to the mobile machine based at least in part on the mobile data; and means for a data store to store an at least one target for the redirector, wherein the data store may dynamically change the redirection to a selected one of the at least one target based at least in part on the context for the beacon.

Example 42 may be example 41, wherein: the security feature includes means for an encoding operation of at least a portion of the beacon data in accord with a cryptosystem; and the security module validates the mobile data by at least applying means for a verification operation of the cryptosystem that corresponds to the encoding operation.

Example 43 may be example 42, wherein the encoding operation is a selected one of: means for a public key cryptosystem (PKI) signing of the at least a portion of the beacon data; or means for a PKI encryption of the at least a portion of the beacon data.

Example 44 may be any of examples 41-43, in which the beacon data includes a first uniform resource locator (URL) broadcast by the beacon, the proxy further comprising: means for a search module to determine if a second URL is in the mobile data; means for a comparison module to determine if the second URL corresponds to the first URL; means for a database storing at least one known URL associated with at least the beacon; wherein the context for the beacon includes the second URL being in the database storing the at least one known URL.

Example 45 may be a physical-web beacon to communicate over a first network with a mobile machine, to communicate over a second network with a management device, the mobile machine to communicate with a proxy to redirect the mobile machine to a network resource on a second network based at least in part on data provided over the first network, the beacon comprising: means for a first communication interface path to broadcast a beacon data to the mobile machine over the first network; means for a second communication interface to receive an update from the management device over the second network, the update encoded in accord with a cryptosystem; means for a context analyzer to at least determine a context for the beacon; and means for a security module to at least validate the update from the management device based on the context.

Example 46 may be example 45, wherein the cryptosystem includes an encoding operation that is a selected one of: means for a public key cryptosystem (PKI) signing of the at least a portion of the beacon data; or means for a PKI encryption of the at least a portion of the beacon data.

It will be apparent to those skilled in the art that these examples are simply exemplary embodiments and other embodiments are contemplated, including other multiple-dependent or means-for variations of the above examples or disclosed embodiments. It also will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus comprising a proxy for at least a physical-web, the proxy including a processor and a memory having associated instructions which when accessed by the processor, causes the apparatus to execute a security module and a context analyzer, the apparatus to communicate over a first communication path with a mobile machine to receive mobile data from the mobile machine, the mobile machine at least temporarily to communicate with a beacon disposed in an environment having an associated event schedule to include event timing, the beacon broadcasting a beacon data to the mobile machine over a second communication path, wherein:

the security module is to at least validate, based at least in part on an expectation of contact from devices determined based at least in part on the event schedule, that the mobile data corresponds to the beacon data broadcast by the beacon; and the context analyzer is to at least confirm the mobile data is received congruent with at least a portion of a context for the beacon, validate the context based at least in part on the expectation of contact for the beacon, and may log an exception if the expectation is not met, wherein the expectation includes whether contact is received during the event timing associated with the beacon;

wherein the apparatus is to further: send a redirection to the mobile machine based at least in part on the mobile data; and store an at least one target for the redirection, the apparatus to dynamically change the redirection to a selected one of the at least one target based at least in part on the context for the beacon.

2. The proxy of claim 1, in which the beacon has an associated security feature, wherein the security module validates the mobile data based at least in part on the security feature.

3. The proxy of claim 2, wherein:
the security feature includes an encoding operation of at least a portion of the beacon data congruent with a cryptosystem; and
the security module validates the mobile data by at least applying a verification operation of the cryptosystem that corresponds to the encoding operation.

4. The proxy of claim 3, wherein the encoding operation is a selected one of:
a public key cryptosystem (PKI) signing of the at least a portion of the beacon data; or
a PKI encryption of the at least a portion of the beacon data.

5. The proxy of claim 1, in which the beacon data includes a first uniform resource locator (URL) broadcast by the beacon, the memory further having associated instructions to provide for:
a search module to search a data store storing at least one known URL associated with the beacon to identify a second URL corresponding to the first URL;
wherein the context for the beacon includes the second URL being available in the second data store.

6. The proxy of claim 1, wherein the context analyzer validates the beacon data against the expectation of contact for devices proximate to the beacon, wherein contact incongruent with the expectation is invalidated by the security module.

7. The proxy of claim 6, wherein the beacon is disposed within a transportation device, and the expectation includes receiving the mobile data during an in-service time of the transportation device.

8. The proxy of claim 1, wherein
the event schedule identifies at least potential events proximate to the beacon, and
a redirector selects the redirection from a first data store based at least in part on an event selected from the potential events, the potential events including at least a holiday, or an entertainment event.

9. An apparatus associated with a beacon disposed in an environment, the environment having an associated event schedule to include service timing for an event associated with the environment, the apparatus including a processor and a memory having associated instructions which when accessed by the processor, causes the apparatus to execute a context analyzer and a security module, the apparatus to:
communicate over a first network with a mobile machine, and
communicate over a second network with a management device,
wherein the mobile machine is to communicate with a proxy to redirect the mobile machine to a network resource on a second network based at least in part on data provided over the first network, and the beacon is to further:
broadcast a beacon data to the mobile machine over the first network;
receive an update from the management device over the second network, the update encoded congruent with a cryptosystem;
the context analyzer to at least determine a context for the beacon based at least in part on an expectation of contact determined based at least in part on the event schedule associated with the environment, and may log an exception if the expectation is not met, wherein the expectation includes whether contact is received during an in-service time associated with the beacon; and
the security module to at least validate the update from the management device based on the context.

10. The beacon of claim 9, wherein the validate the update is also based at least in part on the cryptosystem.

11. The beacon of claim 9, wherein the cryptosystem includes an encoding operation that is a selected one of:
a public key cryptosystem (PKI) signing of the at least a portion of the beacon data; or
a PKI encryption of the at least a portion of the beacon data.

12. The beacon of claim 9, wherein
the beacon data includes a first uniform resource locator (URL); and
the beacon data is arranged so as to be parseable by the proxy to facilitate the proxy to identify the first URL and based thereon to perform the redirect of the mobile machine to a second URL.

13. A method for a proxy to communicate over a first network with a mobile machine,
the mobile machine at least temporarily to communicate with a beacon for a physical-web broadcasting a beacon data to the mobile machine,
the beacon disposed in an environment having an associated schedule to identify at least event timing associated with the environment, the method comprising:
receiving, by the proxy, the mobile data from the mobile machine;
validating, by the proxy, the mobile data corresponds to the beacon data broadcast by the beacon to the mobile machine;
validating, by the proxy, the mobile data is received congruent with a context for the beacon, the context determined based at least in part on an expectation of contact from devices proximate to the environment, the expectation determined at least in part on receiving contact in accord with the event timing indicated by the schedule associated with the environment, wherein the proxy may log an exception if the expectation is not met;
dynamically selecting, by the proxy, a redirection target from a first data store based at least in part on the mobile data and based at least in part on the context for the beacon; and
redirecting, by the proxy, the mobile machine based to the redirection target.

14. The method of claim 13, in which the beacon has an associated security feature, the validating the mobile data further comprising:
performing the validating the mobile data based at least in part on the security feature.

15. The method of claim 14, wherein:
the security feature includes an encoding operation of at least a portion of the beacon data congruent with a cryptosystem; and
the security module validates the mobile data by at least applying a verification operation of the cryptosystem that corresponds to the encoding operation.

16. The method of claim 15, wherein the encoding operation is a selected one of:
a public key cryptosystem (PKI) signing of the at least a portion of the beacon data; or
a PKI encryption of the at least a portion of the beacon data.

17. The method for the proxy of claim 13, in which the beacon data includes a first uniform resource locator (URL) broadcast by the beacon, further comprising:

searching, by the proxy, for a second URL in the mobile data;

determining, by the proxy, if the second URL corresponds to the first URL; and validating, by the proxy, the mobile data satisfies the expectation of contact from the mobile device, wherein the expectation includes receiving the mobile data during an in-service time associated with the beacon.

18. The method of claim 17, further comprising:

setting, by the proxy, the redirection target to URL determined based on the second URL.

19. One or more non-transitory computer-readable media having instructions for a proxy to communicate over a first network with a mobile machine, the mobile machine at least temporarily to communicate with a beacon for a physical-web broadcasting a beacon data to the mobile machine, the beacon disposed in an environment including devices in the environment and an associated schedule to identify at least event timing associated with the environment, the instructions to cause the proxy, in response to execution of the instructions, to:

receive mobile data from the mobile machine;

validate the mobile data corresponds to the beacon data broadcast by the beacon;

determine the mobile machine is proximate to the beacon;

validate the mobile data corresponds to a context for the beacon, the context determined based at least in part on an expectation of contact from devices based at least in part on receiving contact in accord with the event timing indicated by the schedule associated with the environment, wherein the proxy may log an exception if the expectation is not met; and dynamically select a redirection target for the mobile machine based at least in part on the mobile data and based at least in part on the context for the beacon.

20. The one or more non-transitory computer-readable media of claim 19 further including instructions to cause the proxy to:

perform the validate the mobile data based at least in part on a security feature.

21. The one or more non-transitory computer-readable media method of claim 20, wherein the instructions for:

the security feature includes further instructions to cause the proxy to encode operation of at least a portion of the beacon data congruent with a cryptosystem; and a security module includes further instructions to cause the proxy to validate the mobile data by at least applying instructions for a verification operation of the cryptosystem that corresponds to the encoding operation.

22. The one or more non-transitory computer-readable media of claim 21, wherein the instructions to provide for the encoding operation includes instructions to provide for a selected one of:

a public key cryptosystem (PKI) to sign the at least a portion of the beacon data; or a PKI to encrypt the at least a portion of the beacon data.

23. The one or more non-transitory computer-readable media of claim 19, in which the beacon data includes a first uniform resource locator (URL) broadcast by the beacon, the instructions for the proxy further including instructions to cause the proxy to:

search for a second URL in the mobile data;

determine if the second URL corresponds to the first URL;

validate the mobile data satisfies the expectation of contact from the mobile device, wherein the expectation includes to receive the mobile data during an in-service time for an event identified in the schedule; and set the redirection target to URL determined based on the second URL.

\* \* \* \* \*

UNITED STATES PATENT AND TRADEMARK OFFICE
CERTIFICATE OF CORRECTION

PATENT NO. : 11,057,819 B2
APPLICATION NO. : 15/712871
DATED : July 6, 2021
INVENTOR(S) : Richard R. Winterton Page 1 of 1

It is certified that error appears in the above-identified patent and that said Letters Patent is hereby corrected as shown below:

In the Claims

Column 34
Line 7, "...media method..." should read – "...method..."

Signed and Sealed this
Seventh Day of September, 2021

Drew Hirshfeld
*Performing the Functions and Duties of the
Under Secretary of Commerce for Intellectual Property and
Director of the United States Patent and Trademark Office*